(12) United States Patent
Tanaka

(10) Patent No.: US 7,297,434 B2
(45) Date of Patent: Nov. 20, 2007

(54) FUEL CELL

(75) Inventor: Akira Tanaka, Mito (JP)

(73) Assignee: Hitachi, Ltd., Tokyo (JP)

( * ) Notice: Subject to any disclaimer, the term of this patent is extended or adjusted under 35 U.S.C. 154(b) by 533 days.

(21) Appl. No.: 10/642,632

(22) Filed: Aug. 19, 2003

(65) Prior Publication Data

US 2004/0131908 A1      Jul. 8, 2004

(30) Foreign Application Priority Data

Jan. 6, 2003    (JP) .................... 2003-000045

(51) Int. Cl.
*H01M 8/02* (2006.01)
(52) U.S. Cl. .......................... 429/37; 429/66
(58) Field of Classification Search .............. 429/37, 429/66
See application file for complete search history.

(56) References Cited

U.S. PATENT DOCUMENTS

| | | | | |
|---|---|---|---|---|
| 4,317,864 A | * | 3/1982 | Strasser | 429/66 X |
| 4,973,531 A | * | 11/1990 | Zaima et al. | 429/37 |
| 5,185,220 A | * | 2/1993 | Schora | 429/37 X |
| 5,686,200 A | * | 11/1997 | Barton et al. | 429/37 |
| 6,428,921 B1 | * | 8/2002 | Grot | 429/37 |
| 6,645,659 B2 | * | 11/2003 | Bisaka et al. | 429/37 |
| 6,926,988 B2 | * | 8/2005 | Dristy et al. | 429/37 |
| 7,005,209 B1 | * | 2/2006 | Gaines et al. | 429/37 X |

FOREIGN PATENT DOCUMENTS

| | | |
|---|---|---|
| JP | 64-43553 | 3/1989 |
| JP | A-09-22720 | 1/1997 |
| JP | 2000-90956 | 3/2000 |

* cited by examiner

*Primary Examiner*—Stephen J. Kalafut
(74) *Attorney, Agent, or Firm*—Antonelli, Terry, Stout & Kraus, LLP.

(57) ABSTRACT

A fuel cell for generating an electric energy with a chemical reaction between hydrogen and oxygen, has a membrane electrode assembly for generating an electric field through the membrane electrode assembly with the chemical reaction between the oxygen and the hydrogen, a pair of first and second contact members, the first contact member contacting a first side surface of the membrane electrode assembly, and the second contact member contacting a second side surface of the membrane electrode assembly so that the electric field is formed between the first and second contact members, and a pressing member for generating a pressing force for urging each of the first and second contact members toward corresponding one of the first and second side surfaces in a pressing direction.

15 Claims, 4 Drawing Sheets

FUEL CELL

BACKGROUND OF THE INVENTION

The present invention relates to a fuel cell for generating an electric energy with a chemical reaction between hydrogen and oxygen.

In a prior art fuel cell as disclosed by JP-A-09-22720, a membrane electrode assembly (MEA) and a separator are pressed against each other by a fluidal pressure of a coolant.

BRIEF SUMMARY OF THE INVENTION

An object of the present invention is to provide a fuel cell for generating an electric energy with a chemical reaction between hydrogen and oxygen, in which fuel cell an electric contact resistance between a membrane electrode assembly and a contact member contacting the membrane electrode assembly to take out an electric energy from the membrane electrode assembly is securely kept low.

According to the present invention, a fuel cell for generating an electric energy with a chemical reaction between hydrogen and oxygen, comprises, a membrane electrode assembly for generating an electric field through the membrane electrode assembly with the chemical reaction between the oxygen and the hydrogen, a pair of first and second contact members, the first contact member contacting a first side surface of the membrane electrode assembly, and the second contact member contacting a second side surface of the membrane electrode assembly so that the electric field is generated by the membrane electrode assembly between the first and second contact members, and a pressing member for generating a pressing force for urging each of the first and second contact members toward corresponding one of the first and second side surfaces in a pressing direction. Since the each of the first and second contact members is urged toward the corresponding one of the first and second side surfaces in the pressing direction, a contact area between the each of the first and second contact members the corresponding one of the first and second side surfaces is increased to decrease an electric contact resistance therebetween.

The fuel cell may be a direct methanol fuel cell in which a liquid fluid including the hydrogen is capable of being supplied to the membrane electrode assembly through one of the first and second contact members, and the oxygen is capable of being supplied to the membrane electrode assembly through another one of the first and second contact members.

It is preferable for pressing the each of the first and second contact members against the corresponding one of the first and second side surfaces effectively for increasing the contact area between the each of the first and second contact members the corresponding one of the first and second side surfaces, that the first and second contact members contact each other through a mutual contact area other than the first and second side surfaces while the first and second contact members are mechanically connected to each other through the first and second side surfaces, and in a cross sectional view of the fuel cell taken along an imaginary plane which imaginary plane passes the pressing member and the first and second side surfaces and extends parallel to the pressing direction, the pressing member is arranged between the mutual contact area and each of the first and second side surfaces in a transverse direction perpendicular to the pressing direction.

It is preferable for utilizing the pressing force effectively for increasing the contact area between the each of the first and second contact members the corresponding one of the first and second side surfaces, that is, concentrating the pressing force at the contact area, that the mutual contact area is prevented from being arranged at a position between the pressing member and the each of the first and second side surfaces in the transverse direction so that the pressing force is prevented from passing the position to bypass the first and second side surfaces.

The pressing member may be a screw for pressing the each of the first and second contact members against the corresponding one of the first and second side surfaces in accordance with a rotational movement of the screw.

An elastic member through which the first and second contact members are mechanically connected to each other may be arranged at a position between the pressing member and the each of the first and second side surfaces in the transverse direction as seen in a direction perpendicular to the pressing direction and the transverse direction, if a rigidity of the elastic member in the pressing direction against the pressing force is significantly smaller than a rigidity of the membrane electrode assembly in the pressing direction against the pressing force so that the pressing force is substantially prevented from passing the position to bypass the first and second side surfaces. It is acceptable for effectively increasing the contact area between the each of the first and second contact members the corresponding one of the first and second side surfaces that a part less than 10% of the pressing force passes the elastic member to bypass the first and second side surfaces.

The first and second contact members are electrically isolated from each other, and includes respective first and second electrodes to be electrically connected to the first and second side surfaces respectively in such a manner that an electric circuit is formed through the first and second electrodes and the first and second side surfaces. The hydrogen is capable of being supplied to the membrane electrode assembly through one of the first and second contact members, and the oxygen is capable of being supplied to the membrane electrode assembly through another one of the first and second contact members. The membrane electrode assembly includes an anode for ionizing the hydrogen therein, a cathode for reducing the oxygen therein, and an electrolyte layer between the anode and cathode, and one of the first and second side surfaces is formed on one of the anode and cathode, and another one of the first and second side surfaces is formed on another one of the anode and cathode. It is preferable for positioning correctly the membrane electrode assembly that at least one of the first and second contact members has a recess for receiving therein the membrane electrode assembly. The mutual contact area may be formed on a protrusion of at least one of the first and second contact members. At least one of the first and second contact members may include a thin band arranged between the first and second contact members to form the mutual contact area on the thin band.

It is preferable for utilizing the pressing force effectively for increasing the contact area between the each of the first and second contact members the corresponding one of the first and second side surfaces, that is, concentrating the pressing force at the contact area, that the pressing member has a head surface area extending in the transverse direction and contacting one of the first and second contact members to urge the one of the first and second contact member toward the corresponding one of the first and second side surfaces in the pressing direction, and a shaft portion extending in the one of the first and second contact member, and the head surface area is larger than a cross sectional area of the shaft portion as seen in the pressing direction while the first and second contact member are prevented from contacting each other within the head surface area as seen in the pressing direction.

It is preferable for preventing the pressing force from being concentrated at outer peripheral edges of the first and/or side surface of the membrane electrode assembly and distributing the pressing force over a center of the first and/or side surface of the membrane electrode assembly that the pressing force bends at least one of the first and second contact members in such a manner that at a contact point between the membrane electrode assembly and the at least one of the first and second contact members, a tensile stress is generated on a front surface of the at least one of the first and second contact members facing to the membrane electrode assembly and a compressive stress is generated on a reverse surface of the at least one of the first and second contact members opposite in the pressing direction to the front surface so that the front surface of the at least one of the first and second contact members is convexly curved before and/or after contacting and/or being pressed against corresponding one of the first and second side surfaces of the membrane electrode assembly, and/or that one of the first and second contact members has a convexly curved surface curved before and/or after contacting and/or being pressed against corresponding one of the first and second side surfaces of the membrane electrode assembly so that the convexly curved surface is restrained from contacting the corresponding one of the first and second side surfaces of the membrane electrode assembly at peripheral ends of the corresponding one of the first and second side surfaces of the membrane electrode assembly arranged in a direction perpendicular to the pressing direction and/or is encouraged to contact the corresponding one of the first and second side surfaces of the membrane electrode assembly at an intermediate (preferably central) portion of the corresponding one of the first and second side surfaces of the membrane electrode assembly between the peripheral ends thereof arranged in the direction perpendicular to the pressing direction.

Other objects, features and advantages of the invention will become apparent from the following description of the embodiments of the invention taken in conjunction with the accompanying drawings.

DETAILED DESCRIPTION OF THE INVENTION

EMBODIMENT 1

Figure 1:
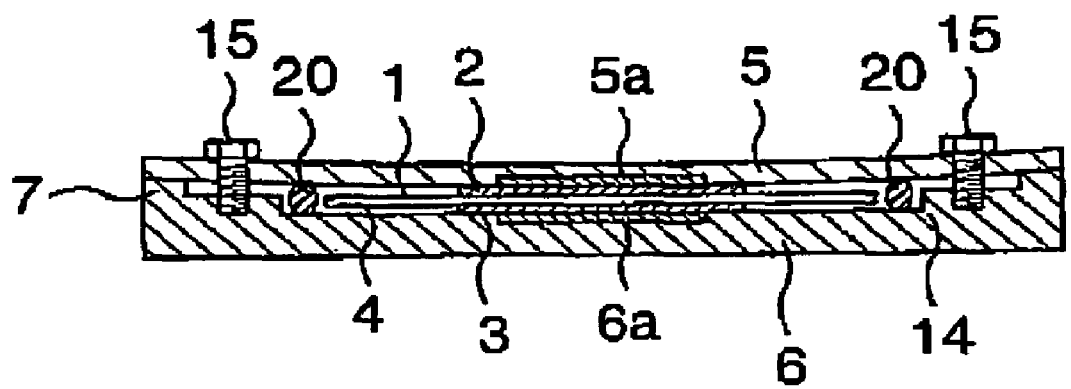
FIG. 1 is a cross sectional view showing a first embodiment of fuel cell of the invention.
Figure 3:
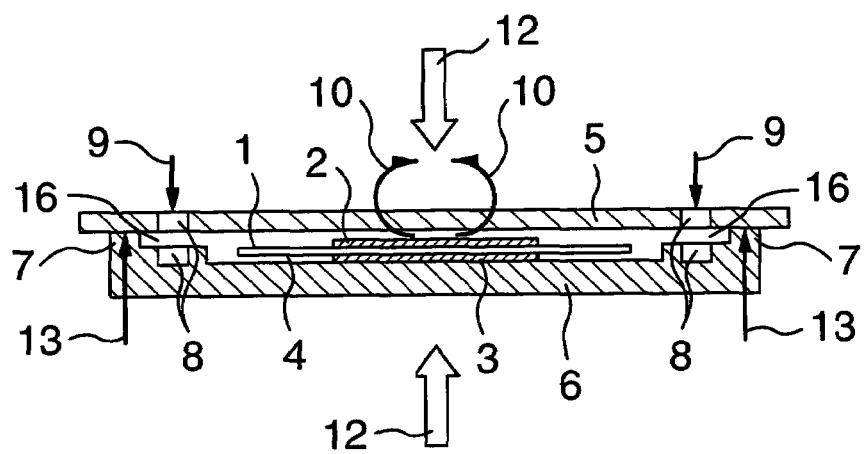
FIG. 3 is a cross sectional view showing a condition of the first embodiment before pressing a contact member against a membrane electrode assembly.
Figure 4:
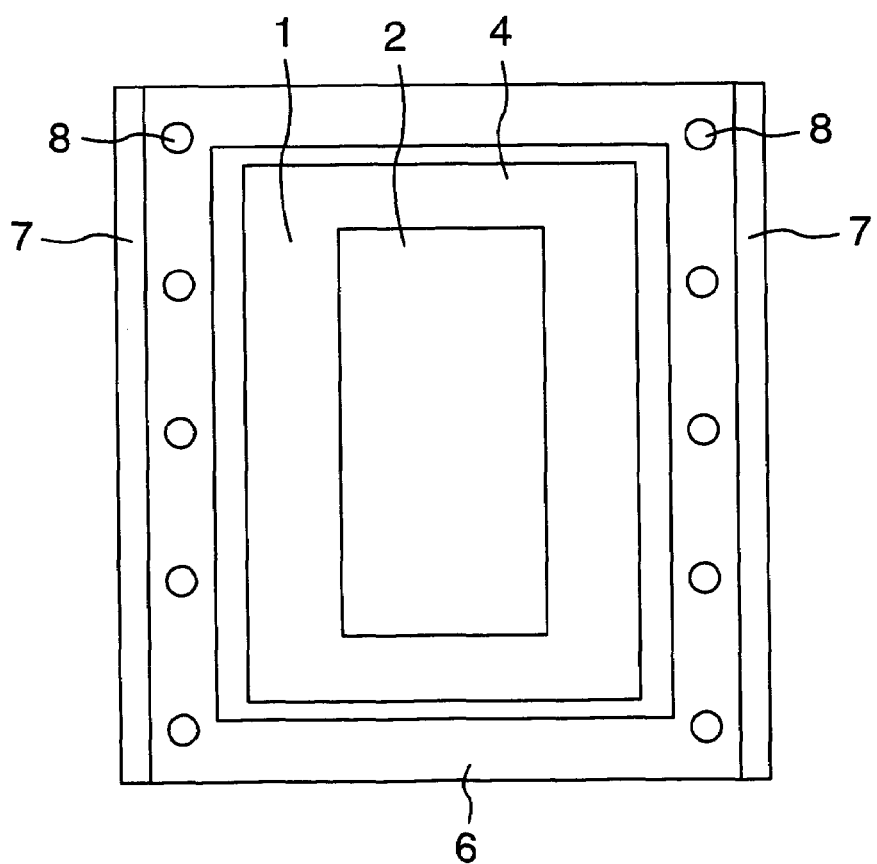
FIG. 4 is an upper view of another contact member of the first embodiment to be pressed against the membrane electrode assembly.

In a direct methanol fuel cell (DMFC) as shown in FIGS. 1, 3 and 4 as the first embodiment, a fuel is methanol including hydrogen. A cathode 2 has a diffusion layer (not shown) and a catalyst layer (not shown) including carrier carbon powder and platinum fine grains carried by the carrier carbon powder. An anode 3 has a diffusion layer (not shown) and a catalyst layer (not shown) including the carrier carbon powder and platinum-fine-grains-and-ruthenium-fine-grains or platinum-ruthenium-alloy-grains carried by the carrier carbon powder. The diffusion layer of the cathode 2 through which water produced in the cathode 2 can be transferred and the diffusion layer of the anode 3 through which the fuel can be diffused are made of, for example, a carbon paper. An electrolyte layer 1 is arranged between the cathode 2 and the anode 3 to be stacked so that a membrane electrode assembly (MEA) 4 is formed.

Since the MEA 4 includes soft elements such as the electrolyte layer 1, catalyst layer and diffusion layer, a contact area between the MEA 4 and each of a cathode side contact member 5 and an anode side contact member 6 as the claimed pair of first and second contact members is increased when the MEA 4 is compressed between the cathode side contact member 5 and anode side contact member 6. If the compression of the MEA 4 between the cathode side contact member 5 and anode side contact member 6 is insufficient, the contact area is not increased sufficiently and whereby an electric contact resistance between the MEA 4 and each of the cathode side contact member 5 and anode side contact member 6 is not decreased sufficiently. If the compression of the MEA 4 between the cathode side contact member 5 and anode side contact member 6 is excessive, the hydrogen, the oxygen and the water or water vapor are restrained from moving in the catalyst layer so that the oxygen and hydrogen are restrained from reaching the electrolyte layer 1 and the water or water vapor produced with generating the electric power is restrained from being discharged from the MEA 4. Since the MEA 4 is received in a recess 14 formed on at least one of the cathode side contact member 5 and anode side contact member 6, the MEA is positioned correctly, and a depth of the recess 14 is determined in such a manner that the compression of the MEA 4 is set appropriately for decreasing the electric contact resistance between the MEA 4 and each of the cathode side contact member 5 and anode side contact member 6 sufficiently and for keeping the movement of the hydrogen, the oxygen and the water or water vapor in the catalyst layer sufficiently. Clamping portions 8 are arranged on respective step areas at ends of the recess 14.

A gasket 20 made of, for example, elastomer is arranged around the MEA 4 in the recess 14 to prevent the fuel from leaking from the recess 14, and a rigidity of the gasket 20 in a pressing direction as shown by an arrow 9 in FIG. 3 against the compression is significantly smaller than a rigidity of the MEA 4 in the pressing direction against the compression so that a considerable part of the pressing force 12 is prevented from passing the gasket 20 to bypass the MEA 4. Arrows 13 represent the reaction force from the support portions 7.

The cathode side contact member 5 has a cathode electrode 5a of copper to be contacted with the cathode 2 so that the cathode side contact member 5 is electrically connected to the cathode 2 through the cathode electrode 5a, and slits (not shown) to supply the air to the cathode 2 through the slits when generating the electric energy with the chemical reaction between the hydrogen in the fuel and the oxygen in the air. A main body of the cathode side contact member 5 on which the cathode electrode 5a is mounted is formed by an alumite plate, and a surface of the cathode electrode 5a facing to the cathode 2 is plated with gold to be prevented from being deteriorated by the methanol as the fuel. The main body of the cathode side contact member 5 may be formed by a stainless steel plate or hard vinyl chloride plate prevented from being deteriorated by the methanol as the fuel. If the stainless steel plate is used, the cathode side contact member 5 and anode side contact member 6 are electrically isolated by an electrically insulating member therebetween.

The anode side contact member 6 has an anode electrode 6a to be contacted with the anode 3 so that the anode side contact member 6 is electrically connected to the anode 3 through the anode electrode 6a, and a fuel supply body to supply the fuel to the anode 3 through the fuel supply body when generating the electric energy with the chemical reaction between the hydrogen in the fuel and the oxygen in the air.

The cathode side contact member 5 is deformed by clamping members 15 whose head portions urge the cathode side contact member 5 toward the anode side contact member 6 to compress the MEA 4 between the cathode side contact member 5 and anode side contact member 6 and whose partially threaded shaft portions extend through the clamping portions 8 and are screwed into the anode side contact member 6 to displace the clamping members 15 in accordance with rotations thereof, and a radially outer side of the cathode side contact member 5 curved by a bending moment 10 generated by a pressing force 12 of the clamping members 15 contacts the cathode 2. In this embodiment, the clamping members 15 are screws, but may be rivets, pairs of bolts and nuts or the like.

The clamping portions 8 and clamping members 15 are arranged between the MEA 4 and support portions 7 as the claimed mutual contact area formed on at least one of the cathode side contact member 5 and anode side contact member 6 so that the cathode side contact member 5 and anode side contact member 6 are mechanically connected to each other through the support portions 7, and as seen in the pressing direction, the cathode side contact member 5 and anode side contact member 6 are prevented from contacting each other to form a clearance 16 between the clamping portions 8 or clamping members 15 and the MEA 4 and within the head portions of the clamping members 15 so that as seen in FIG. 3, a movement, deformation or curving of the cathode side contact member 5 with respect to the cathode 2 is not restrained by the support portions 7 which are prevented from extending or existing between the clamping portions 8 or clamping members 15 and the MEA 4 and within the head portions of the clamping members 15 as seen in the pressing direction.

It is preferable for increasing the pressing force from the cathode side contact member 5 to the MEA 4 that a longitudinal direction of the slits (not shown) for supplying the air to the cathode 2 therethrough is prevented at least partially from being parallel to a longitudinal direction of the support portions 7 and/or a clamping member array axis along which the clamping members 15 are aligned, and/or that a depth of the slits in the pressing direction is as small as possible. It is preferable for increasing the contact area between the cathode 2 and cathode side contact member 5 that a difference between a difference in position in the pressing direction between an area of the cathode side contact member 5 to be contacted with the support portions 7 and another area of the cathode side contact member 5 to be contacted with the cathode 2 before being pressed by the clamping members 15 and a difference in position in the pressing direction between the area of the cathode side contact member 5 to be contacted with the support portions 7 and the another area of the cathode side contact member 5 to be contacted with the cathode 2 after being pressed by the clamping members 15 is as small as possible, and/or that a distance between the clamping members 15 and the MEA 4 is as small as possible. If the cathode side contact member 5 is deformed or bent toward the cathode 2 by the clamping members 15 to have a convex shape to be contacted with the cathode 2 by, for example, a contact point between the cathode side contact member 5 and the cathode 2 closer to the anode side contact member 6 than a contact point between the cathode side contact member 5 and the support portions 7, a pressing force 12 between the clamping members 15 and the cathode 2 is restrained from being applied to peripheral ends of the cathode 2 and is encouraged to be applied to a central portion of the cathode 2 so that the pressing force 12 is utilized effectively for increasing a contact area between the cathode 2 and the cathode side contact member 5.

Figure 7:
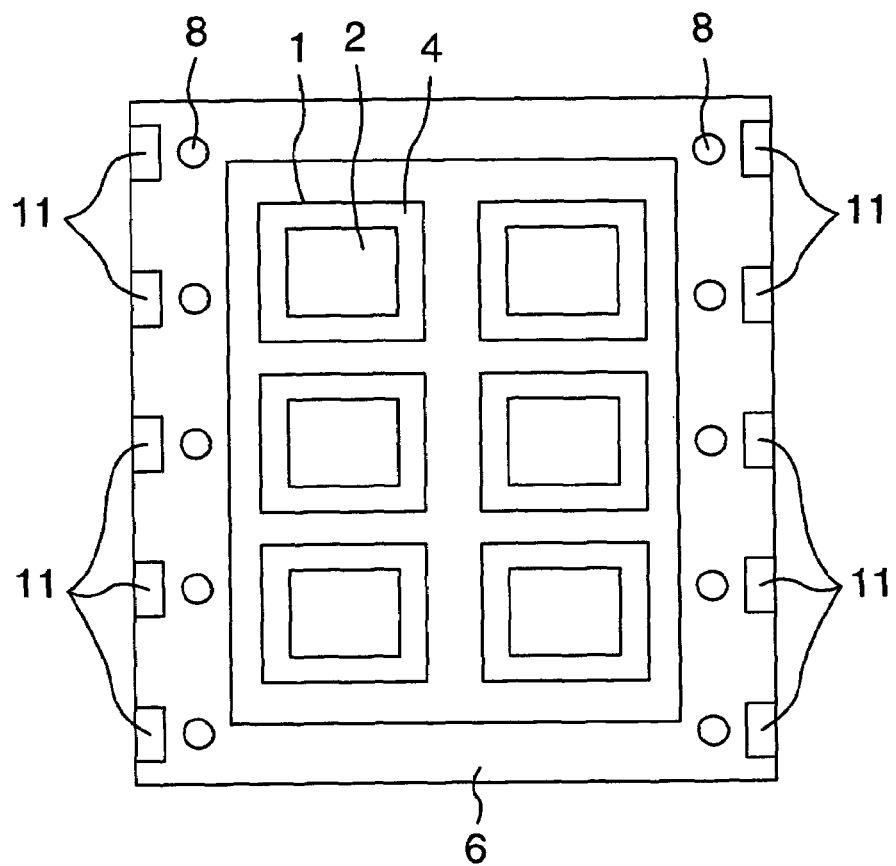
FIG. 7 is an upper view of a contact member of the third embodiment to be pressed against the membrane electrode assembly.

A bending rigidity of the cathode side contact member 5 against the pressing force may be made larger than that of the anode side contact member 6. A plurality of the MEAs 4 may be compressed between the cathode side contact member 5 and anode side contact member 6 as shown in FIG. 7.

EMBODIMENT 2

Figure 5:
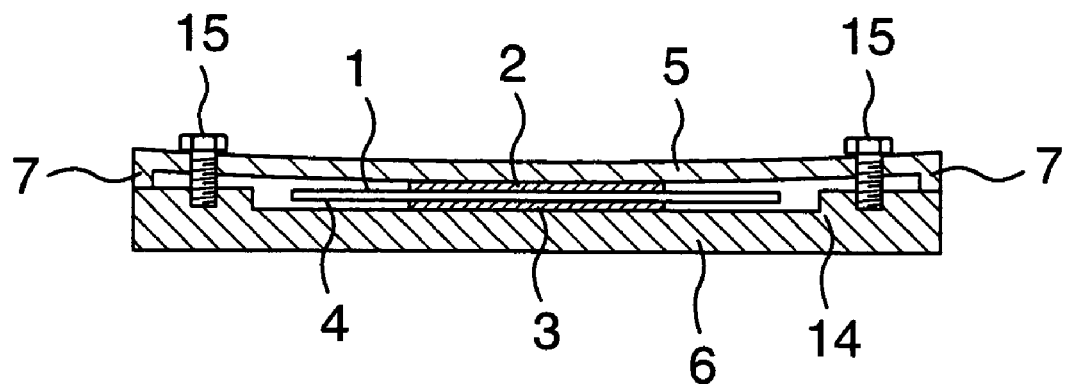
FIG. 5 is a cross sectional view showing a second embodiment of fuel cell of the invention.

As shown in FIG. 5, the support portions 7 may be formed on the cathode side contact member 5.

EMBODIMENT 3

Figure 6:
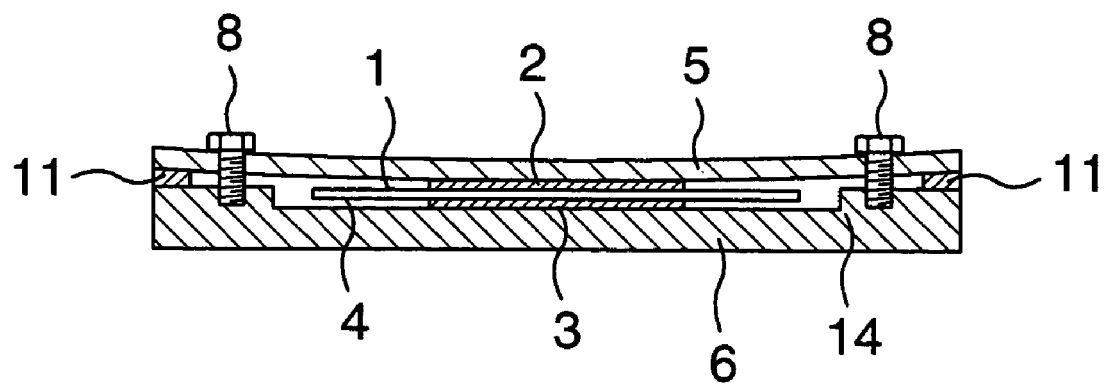
FIG. 6 is a cross sectional view showing a third embodiment of fuel cell of the invention.

As shown in FIG. 6, at least one of the cathode side contact member 5 and anode side contact member 6 may include a band plate 11 to form the support portions 7 thereon. As shown in FIG. 7, the band plate 11 may be divided to band plate elements 11 distant from each other.

EMBODIMENT 4

Figure 2:
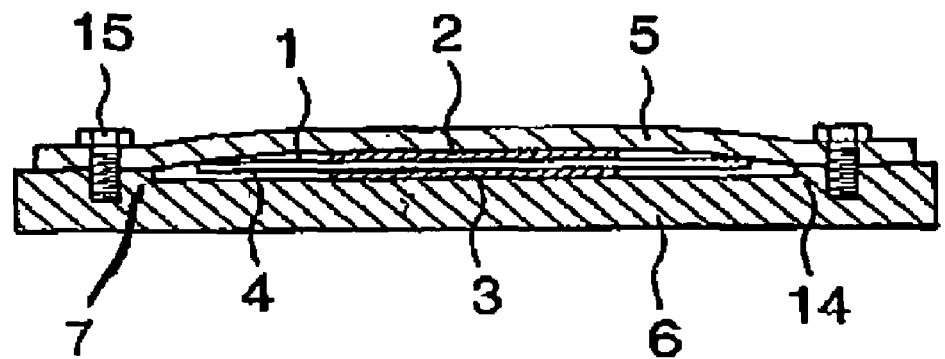
FIG. 2 is a cross sectional view showing a fourth embodiment of fuel cell of the invention.

As shown in FIG. 2, the support portions 7 may exist between the clamping members 15 and the MEA 4, and the cathode side contact member 5 may be bent by the clamping members 15 to form a concave surface to be pressed against the cathode 2.

The cathode side contact member 5 may have various shape to be pressed against the cathode 2 when being clamped by the clamping members 15.

EMBODIMENT 5

Figure 8:
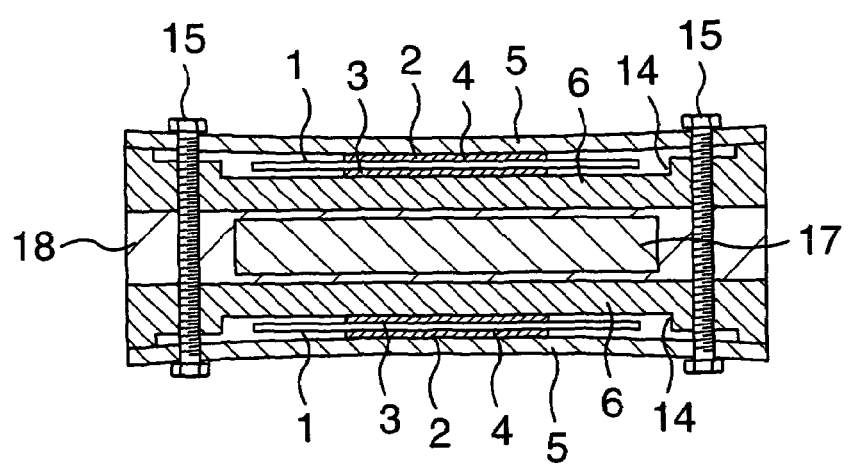
FIG. 8 is a cross sectional view showing a fifth embodiment of fuel cell of the invention.

As shown in FIG. 8, a fuel tank 18 containing therein a fuel 17 may be attached to the anode side contact member 6 while slits (not shown) are formed in the fuel tank 18 and anode side contact member 6 to supply the fuel 17 through the slits to the anode 3, and the fuel tank 18 may be arranged a pair of the fuel cell units. The clamping members 15 may extend from one of the cathode side contact members 5 to another one of the cathode side contact members 5 or the fuel tank 18 to generate the compressing between the cathode side contact member 5 and anode side contact member 6.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A fuel cell for generating an electric energy with a chemical reaction between hydrogen and oxygen, comprising,
    a membrane electrode assembly for generating an electric field through the membrane electrode assembly with the chemical reaction between the oxygen and the hydrogen,
    a pair of first and second contact members, the first contact member contacting a first side surface of the membrane electrode assembly, and the second contact member contacting a second side surface of the membrane electrode assembly, and
    a pressing member for generating a pressing force for urging each of the first and second contact members toward corresponding one of the first and second side surfaces in a pressing direction
    wherein the first and second contact members contact each other through a mutual contact area other than the first and second side surfaces while the first and second contact members are mechanically connected to each other through the first and second side surfaces, and in a cross sectional view of the fuel cell taken along an imaginary plane which imaginary plane passes the pressing member and the first and second side surfaces and extends parallel to the pressing direction, the pressing member is arranged between the mutual contact area and each of the first and second side surfaces in a transverse direction perpendicular to the pressing direction.

2. A fuel cell according to claim 1, wherein the fuel cell is a direct methanol fuel cell, a liquid fluid including the hydrogen is capable of being supplied to the membrane electrode assembly through one of the first and second contact members, and the oxygen is capable of being supplied to the membrane electrode assembly through another one of the first and second contact members.

3. A fuel cell according to claim 1, wherein in the cross sectional view, the mutual contact area is prevented from being arranged at a position between the pressing member and the each of the first and second side surfaces in the transverse direction so that the pressing force is prevented from passing the position to bypass the first and second side surfaces.

4. A fuel cell according to claim 1, wherein the pressing member is a screw for pressing the each of the first and second contact members against the corresponding one of the first and second side surfaces in accordance with a rotational movement of the screw.

5. A fuel cell according to claim 1, further comprising an elastic member through which the first and second contact members are mechanically connected to each other, wherein the elastic member is arranged at a position between the pressing member and the each of the first and second side surfaces in the transverse direction as seen in a direction perpendicular to the pressing direction and the transverse direction, and a rigidity of the elastic member in the pressing direction against the pressing force Is significantly smaller than a rigidity of the membrane electrode assembly in the pressing direction against the pressing force so that the pressing force is substantially prevented from passing the position to bypass the first and second side surfaces.

6. A fuel cell according to claim 5, wherein a part less than 10% of the pressing force passes the elastic member to bypass the first and second side surfaces.

7. A fuel cell according to claim 1, wherein the first and second contact members are electrically isolated from each other, and includes respective first and second electrodes to be electrically connected to the first and second side surfaces respectively in such a manner that an electric circuit is formed through the first and second electrodes and the first and second side surfaces.

8. A fuel cell according to claim 1, wherein the hydrogen is capable of being supplied to the membrane electrode assembly through one of the first and second contact members, and the oxygen is capable of being supplied to the membrane electrode assembly through another one of the first and second contact members.

9. A fuel cell according to claim 1, wherein the membrane electrode assembly includes an anode for ionizing the hydrogen therein, a cathode for reducing the oxygen therein, and an electrolyte layer between the anode and cathode, and one of the first and second side surfaces is formed on one of the anode and cathode, and another one of the first and second side surfaces is formed on another one of the a node and cathode.

10. A fuel cell according to claim 1, wherein at least one of the first and second contact members has a recess for receiving therein the membrane electrode assembly.

11. A fuel cell according to claim 1, wherein the mutual contact area is formed on a protrusion of at least one of the first and second contact members.

12. A fuel cell according to claim 1, wherein at least one of the first and second contact members includes a thin band arranged between the first and second contact members to form the mutual contact area on the thin band.

13. A fuel cell according to claim 1, wherein at least one of the first and second contact members is bent by the pressing force in such a manner that at a contact point between the membrane electrode assembly and at least one of the first and second contact members, a tensile stress is generated on a front surface of the at least one of the first and second contact members facing to the membrane electrode assembly and a compressive stress is generated on a reverse surface of the at least one of the first and second contact members opposite In the pressing direction to the front surface.

14. A fuel cell according to claim 1, wherein one of the first and second contact members has a convexly curved surface contacting corresponding one of the first and second side surfaces of the membrane electrode assembly.

15. A fuel cell for generating an electric energy with a chemical reaction between hydrogen and oxygen, comprising:
    a membrane electrode assembly for generating an electric field through the membrane electrode assembly with the chemical reaction between the oxygen and the hydrogen;
    a pair of first and second contact members, the first contact member contacting a first side surface of the membrane electrode assembly, and the second contact member contacting a second side surface of the membrane electrode assembly; and
    a pressing member for generating a pressing force for urging each of the first and second contact members toward corresponding one of the first and second side surfaces in a pressing direction;

wherein the pressing member has a head surface area extending in the transverse direction and contacting one of the first and second contact members to urge the one of the first and second contact member toward the corresponding one of the first and second side surfaces in the pressing direction, and within the head surface area as seen in the pressing direction, the first and second contact members are prevented from being connected to each other through the membrane electrode assembly in the pressing direction, and are prevented from contacting each other in the pressing direction.

* * * * *